United States Patent Office 3,126,250
Patented Mar. 24, 1964

3,126,250
PROCESS FOR THE DIRECT PREPARATION OF PRACTICALLY SPHERICAL, GRANULAR, AMMONIUM URANYL SULFATE OF UNIFORM PARTICLE SIZE
Marie E. A. Hermans and Theo van der Plas, Arnhem, Netherlands, assignors to Stichting Reactor Centrum Nederland, The Hague, Netherlands
No Drawing. Filed Sept. 16, 1960, Ser. No. 56,336
Claims priority, application Netherlands Sept. 18, 1959
8 Claims. (Cl. 23—14.5)

This invention relates to a process for the direct preparation of practically spherical, granular, uraniferous material of uniform particle size.

For the purpose of preparing fissile material and/or fertile material for nuclear reactors, particularly in such cases where use is made of a suspension or slurry of granular fissile material in a carrier liquid, it is of advantage to have a method which makes it possible to directly obtain granular, uraniferous material of a very uniform particle size and a practically spherical shape, without requiring that the chemical or physical preparation be followed by complicated separating or classifying processes. It is furthermore of advantage if important properties of the material, such as a smooth surface, are to be obtained in a reproducible manner.

The main object of the invention is to provide an improved process of the kind specified yielding granular uraniferous material of very uniform particle size and practically spherical form, having a particle size distribution curve showing one distinct and very narrow maximum.

A further object of the invention is to provide such process wherein granular uraniferous material is obtained that is very suitable as a basis for the preparation of granular uranium dioxide that may be advantageously utilised as the fissile material in homogeneous nuclear reactors of the suspension or slurry type, as described, e.g., in the co-pending Went application, Serial No. 536,638, filed September 26, 1955.

Further objects of the invention will become apparent from the following description and appertaining claims and from the examples hereinafter given by way of illustration and not of limitation.

According to the invention, there is provided a process for the direct preparation of practically spherical, granular uraniferous material of uniform particle size comprising adding ammonia to a solution of an uranyl salt up to the point of incipient precipitation, dissolving while stirring a relatively great amount of ammonium sulphate into the solution thus obtained, stirring the mixture until termination of the precipitation while its pH does not fall below a critical value lying between 2 and 3, and separating the precipitate.

The actual critical pH value, which is already within narrow limits, is substantially determined by the initial concentration of the uranyl salt solution. The higher that concentration, the lower the critical pH value may be.

The dissolution of ammonium sulphate may be effected either by adding a concentrated solution of ammonium sulphate or by adding solid ammonium sulphate. In the latter case, the sulphate must first completely dissolve before precipitation is allowed to start.

Preferably, the process according to the invention is carried out at room temperature.

The precipitate obtained in the process according to the invention consists of uraniferous material of a complex composition made up of particles with a smooth surface which are very nearly spherical. It shows a particle size distribution curve with a sharp maximum as a very specific particle size.

The precipitate according to the invention differs essentially, as may be shown by means of X-ray analysis, from the product obtained by digesting an aqueous suspension of an alkali-containing uranium compound with sulphuric acid and ammonium sulphate.

In order to prevent the formation of a precipitate at too low a pH value, in which case the precipitate would, as regards composition and properties, compare unfavourably with the precipitate to be obtained under the right conditions, it is recommended that a quantity of ammonium salt be supplied to the liquid before ammonia is added. Preferably, ammonium nitrate is used for this purpose. This measure is particularly of importance when it is desirable to use relatively highly concentrated uranyl solutions.

The precipitate hereinbefore described is very suitable as a basis for the preparation of modified uraniferous material, for instance uranium dioxide, of likewise definite shape and uniform particle size distribution. This may be achieved by conversion with aqueous ammonia of the precipitate while moderately heating, e.g. up to 40° C., followed by drying and reduction, e.g. with hydrogen.

Preferably, the precipitate, before being converted with ammonia, is heated at a temperature above 100° C., e.g. up to 150° C.

The uranium dioxide thus obtained is particularly suitable for use as fissile material in a suspension or slurry nuclear reactor with continuous purification during operation (see co-pending Went application, Serial No. 536,638).

The following examples, while not restricting the scope of the invention, are illustrative thereof.

*Example I*

To 50 millilitres of an aqueous uranyl nitrate solution, which contains per litre 210 grams of uranium and 1.58 gram equivalents of nitrate ions, is added 2.0 grams of solid ammonium nitrate. After this has been dissolved, 34 millilitres of 1 N ammonia are added at a temperature of 20° C. There is just no precipitate formed.

Subsequently 5.0 grams of solid ammonium sulphate are added while simultaneously stirring; a few seconds after the sulphate has dissolved completely, a yellow precipitate begins to form. The precipitation is completed after 90 minutes. The moment the precipitation is finished the pH of the liquid is 2.9.

A quantity of 9.4 grams of precipitate is obtained containing 64.9% of U, 13.9% of $SO_4^{--}$ and 2.7% of $NH_4^+$.

The precipitate consists of practically spherical granules with a smooth surface. The particle size distribution curve shows a sharp maximum at 10 microns.

From the precipitate, after pre-heating to 150° C., conversion with ammonia and reduction with hydrogen, granular $UO_2$ was obtained with a smooth surface and a practically spherical shape, and a characteristic particle size curve with a very sharp maximum at 7 microns.

*Example II*

To 50 millilitres of an aqueous uranyl nitrate solution, which contains per litre 433 grams of uranium and 3.62 grams equivalents of nitrate ions, is added 0.44 gram of solid ammonium nitrate. After this has been dissolved, 30 millilitres of 2 N ammonia are added to the solution at a temperature of 15° C. There is just no precipitate formed.

Subsequently 10.0 grams of solid ammonium sulphate are added while simultaneously stirring; 30 seconds after the sulphate has dissolved completely, a yellow precipitate begins to form. The precipitation is completed after 60 minutes. The moment the precipitation is finished the pH of the liquid is 2.3.

An amount of 12.8 grams of precipitate is obtained containing 64.0% of U, 14.4% of $SO_4^{--}$, and 3.3% of $NH_4^+$.

The precipitate consists of practically spherical granules with a smooth surface. The particle size distribution curve shows a sharp maximum at 6 microns.

From the precipitate, after pre-heating to 150° C., conversion with ammonia and reduction with hydrogen, granular $UO_2$ was obtained with a smooth surface and a practically spherical shape, and a characteristic particle size curve with a sharp maximum at 4 microns.

What we claim is:

1. A process for the direct preparation of practically spherical, granular uraniferous material of uniform particle size comprising adding ammonia to a solution of an uranyl salt up to the point of incipient precipitation, dissolving while stirring a relatively great amount of ammonium sulphate into the solution thus obtained, stirring the mixture until termination of the precipitation, maintaining the pH at the termination of the precipitation at a critical value lying between 2 and 3, and separating the complex ammonium uranyl sulfate precipitate in the form of substantially uniform spheres.

2. A process according to claim 1, comprising adding an ammonium salt to the uranyl salt solution before the addition of ammonia.

3. A process according to claim 1 comprising adding ammonium nitrate to the uranyl salt solution before the addition of ammonia.

4. A process according to claim 1 comprising keeping the temperature of the mixture during precipitation at room temperature.

5. A process according to claim 1 including the additional steps of converting the precipitate with aqueous ammonia while slightly heating, drying the solid substance thus obtained and chemically reducing it subsequently and recovering the uranium dioxide obtained.

6. A process according to claim 5 comprising heating the precipitate up to about 150° C. before conversion with ammonia.

7. A process for the preparation of spherical, granular, uraniferous material of uniform particle size consisting essentially of adding ammonia to a solution of uranyl nitrate up to the point of incipient precipitation, adding a relative large amount of ammonium sulfate into the solution thus obtained, stirring the mixture until termination of the precipitation, maintaining the pH at the termination of the precipitation between 2 and 3, and separating the complex ammonium uranyl sulfate precipitate in the form of spheres of substantially uniform particle size not in excess of about 10 microns.

8. A process according to claim 7 wherein the uranyl nitrate solution prior to the addition of the ammonia also includes ammonium nitrate.

References Cited in the file of this patent

UNITED STATES PATENTS

| | | |
|---|---|---|
| 2,536,347 | Bremm et al. | Jan. 2, 1951 |
| 2,711,361 | Morris | June 21, 1955 |
| 2,762,685 | Brundin | Sept. 11, 1956 |
| 2,771,338 | Spiegler | Nov. 20, 1956 |
| 2,982,602 | Sherk et al. | May 2, 1961 |

OTHER REFERENCES

Compte Rendu, volume 185 (1927), pages 273–275.

Harrington et al.: "Chemical Engineering Progress," volume 54, number 3, March 1958, pages 65–70.